No. 825,455. PATENTED JULY 10, 1906.
C. A. GULLUM.
PISTON PACKING.
APPLICATION FILED AUG. 14, 1905.

Witnesses
Benj. Finckel
Alice B. Cook.

Inventor
Charles A. Gullum
by Finckel & Finckel
his Attorneys

UNITED STATES PATENT OFFICE

CHARLES A. GULLUM, OF COLUMBUS, OHIO.

PISTON-PACKING.

No. 825,455.　　　Specification of Letters Patent.　　　Patented July 10, 1906.

Application filed August 14, 1905. Serial No. 274,179.

*To all whom it may concern:*

Be it known that I, CHARLES A. GULLUM, a citizen of the United States, residing at Columbus, in the county of Franklin and State of Ohio, have invented certain new and useful Improvements in Piston-Packings; and I do hereby declare the following to be a full, clear, and exact description of the invention, such as will enable others skilled in the art to which it appertains to make and use the same.

This invention is an improvement on Letters Patent of the United States No. 341,138, dated May 4, 1886, its object being to simplify and cheapen the construction and make it more effective in use.

Figure 1:
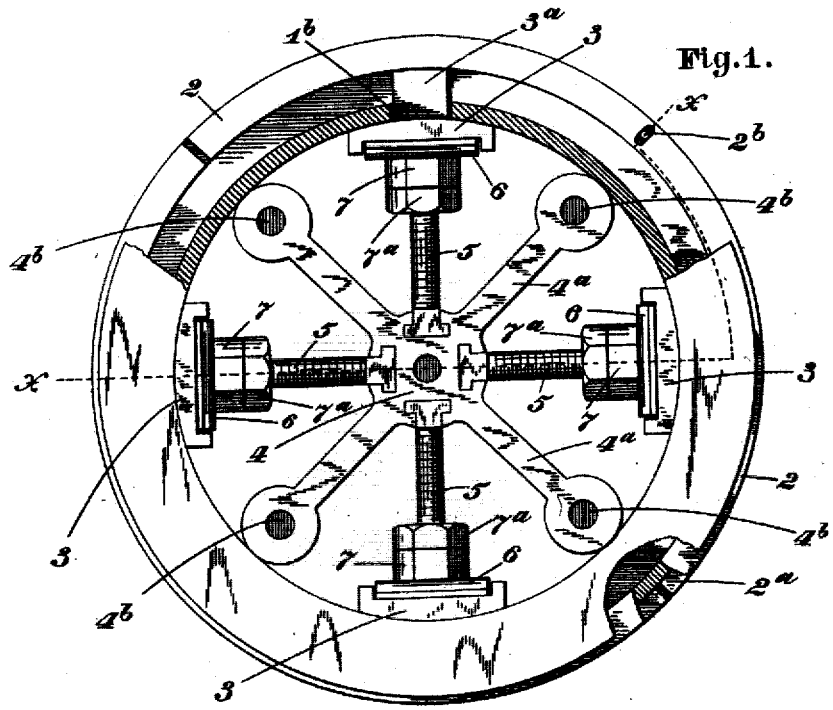
Figure 2:
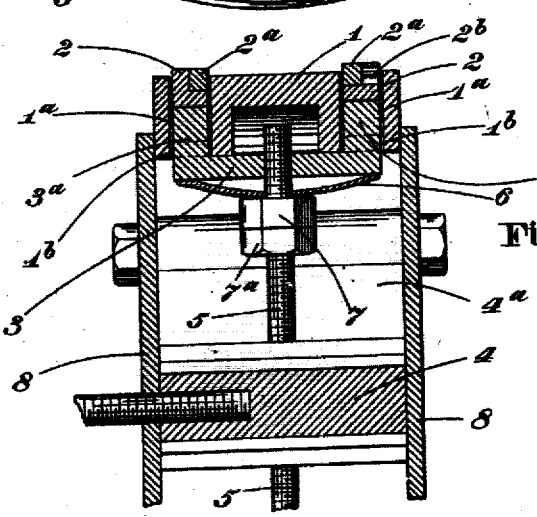

In the accompanying drawings, illustrating an embodiment of the improvements, Figure 1 is a side elevation, partially in section; and Fig. 2 is a detail cross-sectional view taken on the radial plane $xx$, Fig. 1.

In the views, 1 designates the bull-ring, which is a solid or integral structure, and has at its outer side two circumambient grooves $1^a$, the said walls of which grooves are parallel. In each of these grooves are sprung two split rings 2 and $2^a$. The ring 2 is of right-angle cross-section, and the ring $2^a$ is a plane flat one or of rectangular cross-section and adapted to rest on the horizontal flange of the ring 2. The rings 2 and $2^a$ are placed together to break joints, and they are limited in their annular movement with respect to each other by means of a lateral pin $2^b$ on the ring $2^a$, that enters a transverse slot in the vertical flange of the ring 2.

3 designates seats having lugs $3^a$, that project from the inner side of the bull-ring through openings $1^b$ therein into the grooves $1^a$. The rings 2 and $2^a$ normally rest in the ends of the lugs $3^a$.

4 designates the hub of a spider having radial arms $4^a$. Fitting in T-shaped grooves in the hub 4 are the T-heads of threaded radial bolts 5. The outer ends of these bolts 5 are passed loosely through holes in the seats 3. Loosely on the threads and backing the seats 3 are springs 6, against which are turned nuts 7, the latter being locked in place by additional nuts $7^a$. The rings 2 and $2^a$ are therefore yieldingly supported.

The sides of the piston are closed by means of plates 8, secured to the spider by bolts or screws entering holes $4^b$.

With this construction a nearly perfectly closed contact between the piston and cylinder is secured, and because the rings 2 and $2^a$ are yieldingly supported the packing accommodates itself to inequalities in the diameter of the cylinder.

What I claim, and desire to secure by Letters Patent, is—

1. In a piston-packing, the solid or integral bull-ring provided with a circumambient groove having parallel side walls, combined with a pair of expansible rings in said groove one of which affords a seat for the other.

2. In a piston-packing, the solid or integral bull-ring provided with a circumambient groove having parallel side walls, combined with a pair of expansible rings in said groove, and means to limit the annular movement of the rings with respect to each other.

3. In a piston-packing, the solid or integral bull-ring provided with a circumambient groove having parallel side walls, combined with a pair of split expansible rings in said groove placed on each other to break joints, and means for limiting the annular movement of the rings with respect to each other.

4. In a piston-packing the solid or integral bull-ring provided with a circumambient groove having parallel side walls, combined with an expansible packing-ring in said groove, a seat having a lug for supporting said packing-ring, the spider provided with a hub having a T-shaped groove, threaded T-bolt sliding into and supported in said T-shaped groove, and a spring and a nut on said bolt supporting yieldingly the aforesaid seat for the packing-ring.

In testimony whereof I affix my signature in presence of two witnesses.

CHARLES A. GULLUM.

Witnesses:
　GEO. M. FINCKEL,
　A. L. RALSTON.